United States Patent [19]
Cooke et al.

[11] Patent Number: 5,960,546
[45] Date of Patent: Oct. 5, 1999

[54] PRUNING DEVICE AND PACKAGE THEREFOR

[75] Inventors: James M. Cooke, Vista; Richard M. Warden, San Diego, both of Calif.

[73] Assignee: Seymour Manufacturing Co., Seymour, Ind.

[21] Appl. No.: 08/878,307

[22] Filed: Jun. 18, 1997

[51] Int. Cl.$^6$ .................................................... A01G 3/08
[52] U.S. Cl. ............................................. 30/249; 30/188
[58] Field of Search ............................... 30/188, 249–251

[56] References Cited

U.S. PATENT DOCUMENTS

| | | |
|---|---|---|
| 4,165,805 | 8/1979 | Fethke et al. . |
| 4,179,029 | 12/1979 | Fethke et al. . |
| 4,224,739 | 9/1980 | Emblidge ................................. 30/249 |
| 4,420,883 | 12/1983 | Wallace et al. ........................... 30/249 |
| 4,714,159 | 12/1987 | Linden . |
| 5,084,975 | 2/1992 | Melter ...................................... 30/249 |
| 5,279,417 | 1/1994 | Seaton . |
| 5,435,447 | 7/1995 | Weatherford et al. . |
| 5,595,295 | 1/1997 | Lin . |
| 5,622,258 | 4/1997 | Baublitz et al. . |
| 5,745,998 | 5/1998 | Le et al. ................................... 30/249 |

FOREIGN PATENT DOCUMENTS

9725187  7/1997  WIPO .

*Primary Examiner*—Douglas D. Watts
*Attorney, Agent, or Firm*—Polster, Lieder, Woodruff & Lucchesi

[57] ABSTRACT

A pruning device for cutting limbs includes a hollow tubular pole having an actuating assembly mounted on a first end of the pole, and a cutting assembly for engaging and cutting a limb mounted on a second end of the pole. A cable extends axially through the pole. The cable is connected at one end to the actuating assembly, and at the other end to the cutting assembly. The actuating assembly applies pulling force to the cable upon its operation. The cable triggers operation of the cutting assembly when the cable is subjected to pulling force. The cutting head includes a hook adapted to receive the limb, and a cutting blade pivotally mounted to the hook for cutting the limb. The blade pivotally moves toward the hook upon operation of the actuating assembly. The cutting head also includes a pulley assembly through which the cable is run upon exiting the pole. The pulley assembly effectively increases the force with which the blade moves toward the hook by increasing the pulling force applied to the cable. The pulley assembly also draws the cable tight during operation of the pruning device. The cutting head is disposed inside a package that allows for operation of the pruning device without removing the cutting head from the package.

8 Claims, 5 Drawing Sheets

PRUNING DEVICE AND PACKAGE THEREFOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to cutting tools, and in particular a multi-purpose pruning device having an actuating cable or rope internally disposed in a handle on which pruning shears are mounted. Improved packaging also is provided for displaying the pruning device for sale. The packaging allows a potential customer to manually operate the pruning device without removing the pruner from the packaging.

Conventional pruning devices generally include a cutting head or shears mounted on top of a pole. A rope or cable is attached to the cutting head to allow a user to actuate the shears by pulling on the rope. Typically, the rope is externally mounted outside the pole such that the rope hangs freely from the cutting head. Operation of such a pruning device requires considerable coordination and strength since the user must balance and position the shears and pole while pulling on the rope to prune a tree or shrub. Moreover, the pruning device must be carefully inserted in the tree or shrub to avoid tangling the rope on branches, twigs or leaves.

Therefore, it is desirable to develop a pruning device that is easy to operate and does not employ an externally mounted cable. To this end, U.S. Pat. No. 5,084,975, issued Feb. 4, 1992 to C. Melter and assigned to Fiskars Oy Ab, sets forth an extendible pruner in which the cable is mounted in a telescopic handle. In order to maintain tension in the cable when the length of the pole is changed, the '975 patent employs an elaborate pulley assembly in the pole. However, use of such a pulley assembly necessitates complex and labor-intensive assembly processes that increase the cost of the product. Furthermore, the extendible pruner of the '975 patent cannot be easily repaired if the cable becomes disengaged from one of the pulleys since the pulleys are mounted inside the pole. The pulley assembly also increases the weight of the pole, making it more difficult for an operator to maneuver, position and support the pruner. Thus, it also is desirable to develop a pruning device that is relatively lightweight, inexpensive to manufacture, and easily repaired.

Pruning devices often are displayed for sale by placing the cutting head in clear packaging that allows a potential customer to view the components of the cutting head. The pole on which the cutting head is mounted typically extends outwardly from the packaging. The packaging provides protection from accidental contact with the sharp edges of the hook and blade. However, the packaging also prevents a customer from operating the pruner before purchasing the device. Therefore, it is desirable to provide packaging for a pruner that provides necessary protection from sharp edges of the cutting head, and allows a customer to manipulate the cutting head by operating an actuating handle attached at an opposite end of the pole before purchasing the device.

BRIEF SUMMARY OF THE INVENTION

Accordingly, one object of the present invention is to provide an improved and simplified pruning device having a cable or rope internally mounted inside a pole on which a cutting head is mounted.

Another object of this invention is to provide an improved pruning device that is relatively light-weight and easy to operate.

Another object of this invention is to provide an improved pruning device that employs a pulley assembly to increase force exerted on the cutting head when the user operates an associated actuating assembly and to keep the cable properly aligned in the tube.

Still another object of this invention is to provide an improved pruning device that is readily manufactured for minimal cost.

Yet another object of this invention is to provide improved packaging for displaying and containing the pruning device that allows for a customer to manipulate the cutting head by operating an actuating handle attached at an opposite end of the pole without removing the pruning device from the packaging.

These and other objects will become apparent to those skilled in the art in light of the following disclosure and accompanying drawings.

In accordance with the invention, generally stated, a pruning device is provided that includes a hollow tubular pole having a cutting head mounted at one end of the pole by an integral pole clamp. An actuating assembly or handle is attached at the other end of the pole. A cable or rope extends axially inside the pole. One end of the cable is connected to the actuating handle, and the other end is operably connected to the shears via pulleys. An additional pulley is pivotably attached to the shears and guides the cable smoothly into the tubular pole. The pivoted pulley preferably is movable between a first position engaging a top of the pole clamp and a second position spaced from the top of the pole clamp.

In accordance with another aspect of the invention, the actuating handle includes a portion which extends telescopically into the tubular pole and a smaller diameter tube fixed to the interior of the portion. A stop, such as a washer, on a lower end of the cable forms an interference fit with the smaller diameter tube, to fix the lower end of the cable in the actuating handle.

Another aspect of the present invention is improved packaging for displaying and containing the pruning device. The package allows a customer to view the product and its features while manipulating the cutting head by operating the actuating assembly. Such packaging also allows for the display of eye-catching or informative literature or labels. In the preferred embodiment, the package generally has a rectangular shape with a molded cavity formed therein that is adapted to contain the cutting head. One side of the packaging has an opening or slot formed therein through which a lever portion of the cutting head passes when the handle is actuated by the user. Other components associated with the cutting head move freely inside the cavity when the handle is actuated. An opening is formed in a bottom side of the packaging through which the pole extends.

Other objects and features will be apparent and in part pointed out hereinafter.

DETAILED DESCRIPTION OF THE INVENTION

The following detailed description illustrates the preferred embodiment of the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

Figure 1:
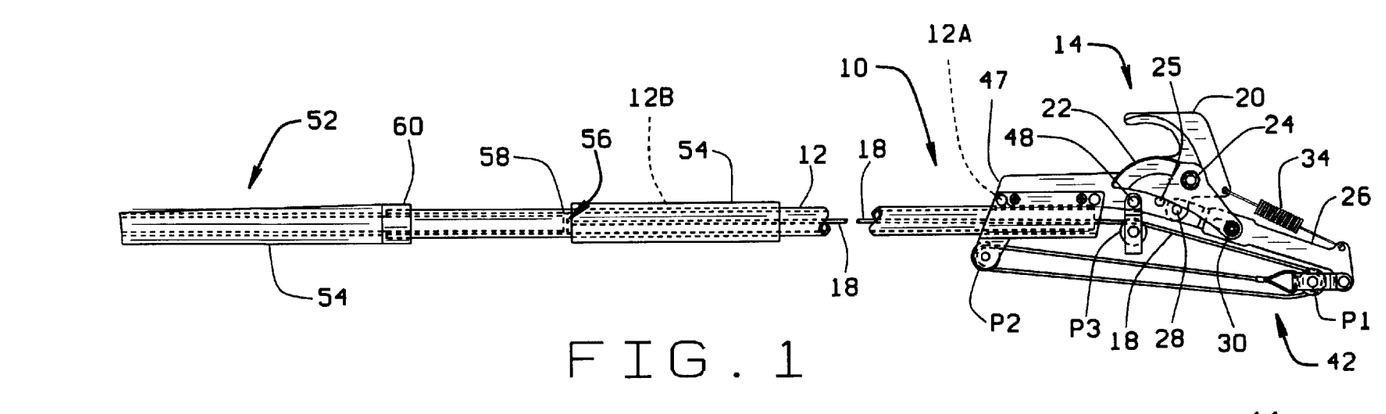
FIG. 1 is a front elevational view of the pruning device of the present invention.
Figure 2:
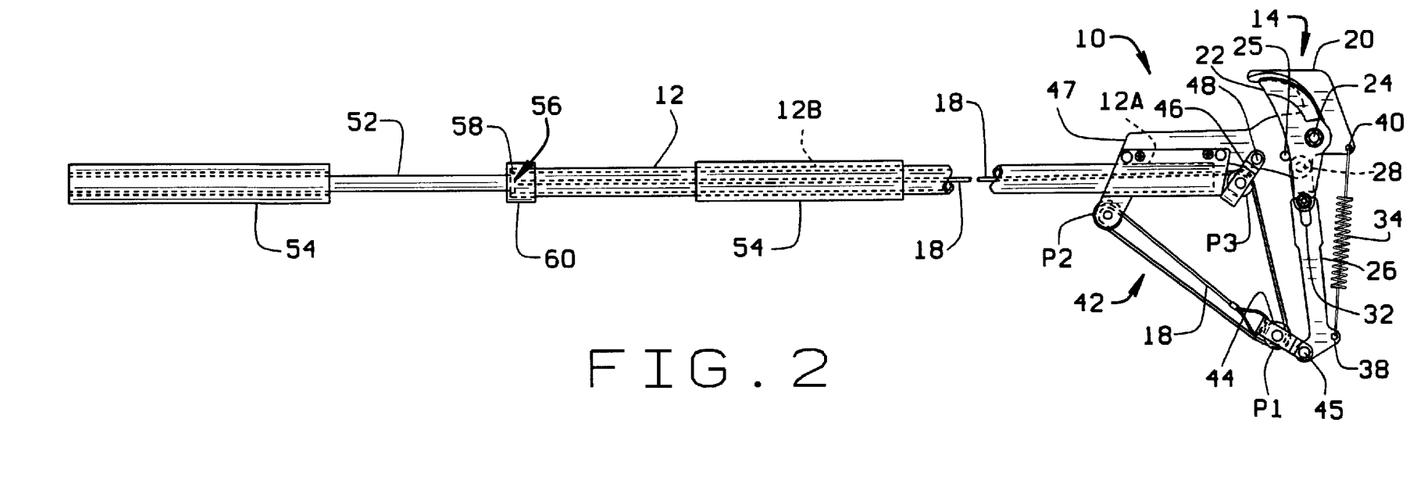
FIG. 2 is a front elevational view of the pruning device shown in FIG. 1, showing the positioning of the components of the cutting head when the actuating assembly is triggered.

Referring now to the drawings, and in particular to FIGS. 1 and 2, a pruning device is shown, referred to generally by reference numeral 10, for cutting branches or twigs growing on trees, shrubs or the like. The pruning device 10 includes a hollow tubular pole or shaft 12 having a shears or cutting head assembly 14 mounted at a first or upper end 12A of the pole 12 and an actuating assembly 16 attached at a second or lower end 12B of the pole 12. A cable 18 extends inside the pole 12, and operably connects the actuating assembly 16 to the cutting head 14. When the actuating assembly 16 is triggered by a user, pulling or tensile force is exerted on the cable 18 which actuates the cutting head 14. The preferred cable 18 is made of twisted steel strands and coated with plastic.

The cutting head 14 of the preferred embodiment is a simple modification of a commercially available cutting head, illustratively a head manufactured by Xcellent Mfg. Associates Co., Taipei, Taiwan, Republic of China, and sold under the designation M4B2. The head 14 includes a pole clamp 17 that is secured to the upper end 12A of the pole 12 by two bolts 19 and nuts (not shown). The cutting head 14 also includes a stationary hook body 20 formed of sheet steel and riveted to one wing 17A of the clamp 17. The hook body 20 has a curved edge 21 adapted to engage a branch or twig, and a movable blade 22 pivotally secured by a bolt 24 to the hook body 20. The hook edge 21 illustratively accommodates a 3.2 cm branch. The hook 20 and blade 22 operate in a conventional manner such that the blade 22 pivotally moves toward the surface 21 of the hook 20 when the actuating assembly 16 is triggered.

Figure 4:
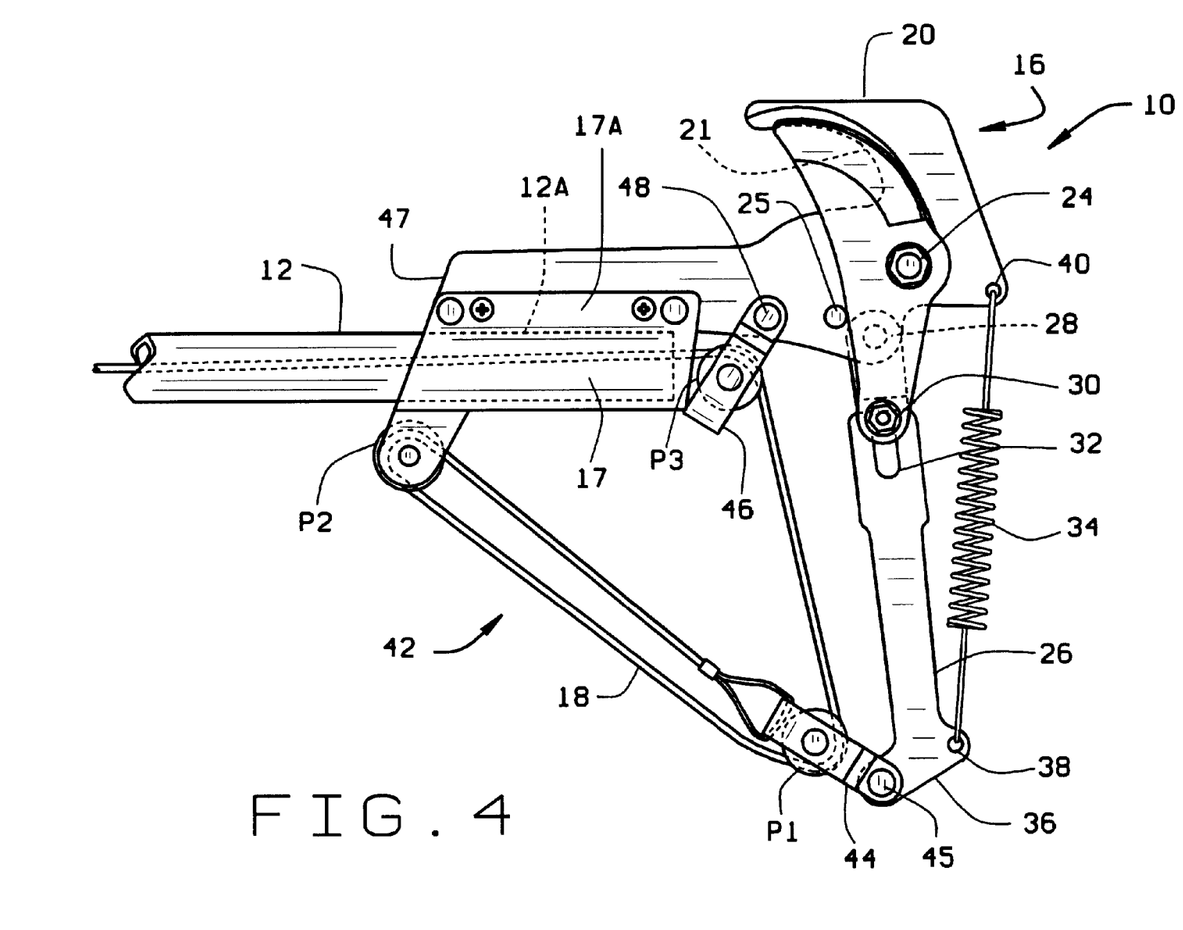
FIG. 4 is a fragmentary front elevational view of the cutting head shown in FIG. 2 when the cutting head is actuated.
Figure 5:
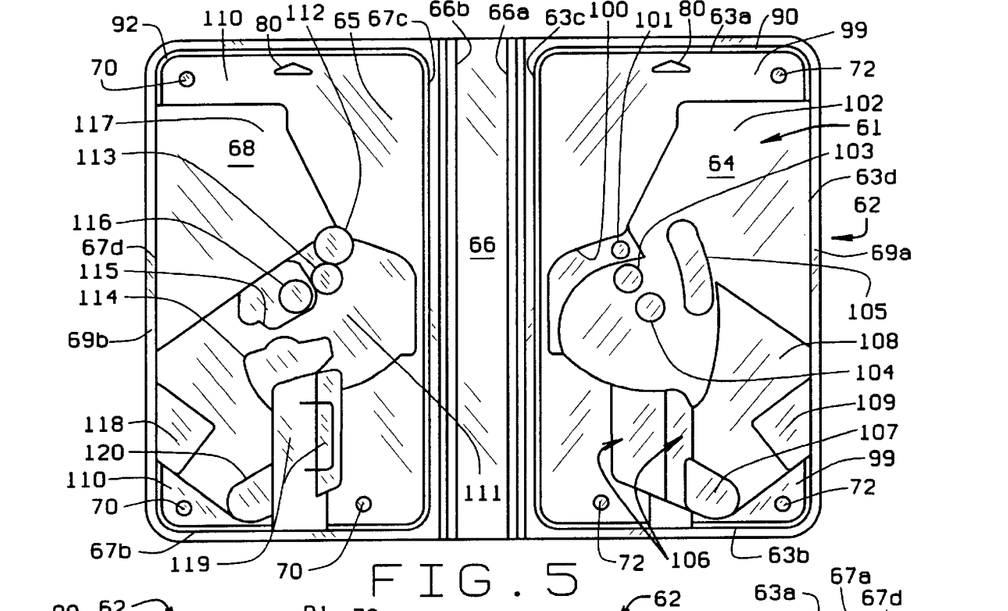
FIG. 5 is a front elevational view of a package used to contain the cutting head.

A lever arm 26 is pivotally mounted on the hook body 20 by a pin 28. The lever arm 26 also is secured to the blade 22 by a bolt 30 that extends through a slot 32 formed in the lever arm 26. As shown in FIG. 4, the bolt 30 slidably moves in the slot 32 toward the pin 28 when the cable 18 is pulled. Movement of the bolt 30 within the slot 32 accommodates the slight difference in the rotational tracks of the lever arm 26 and the blade 22.

Figure 3:
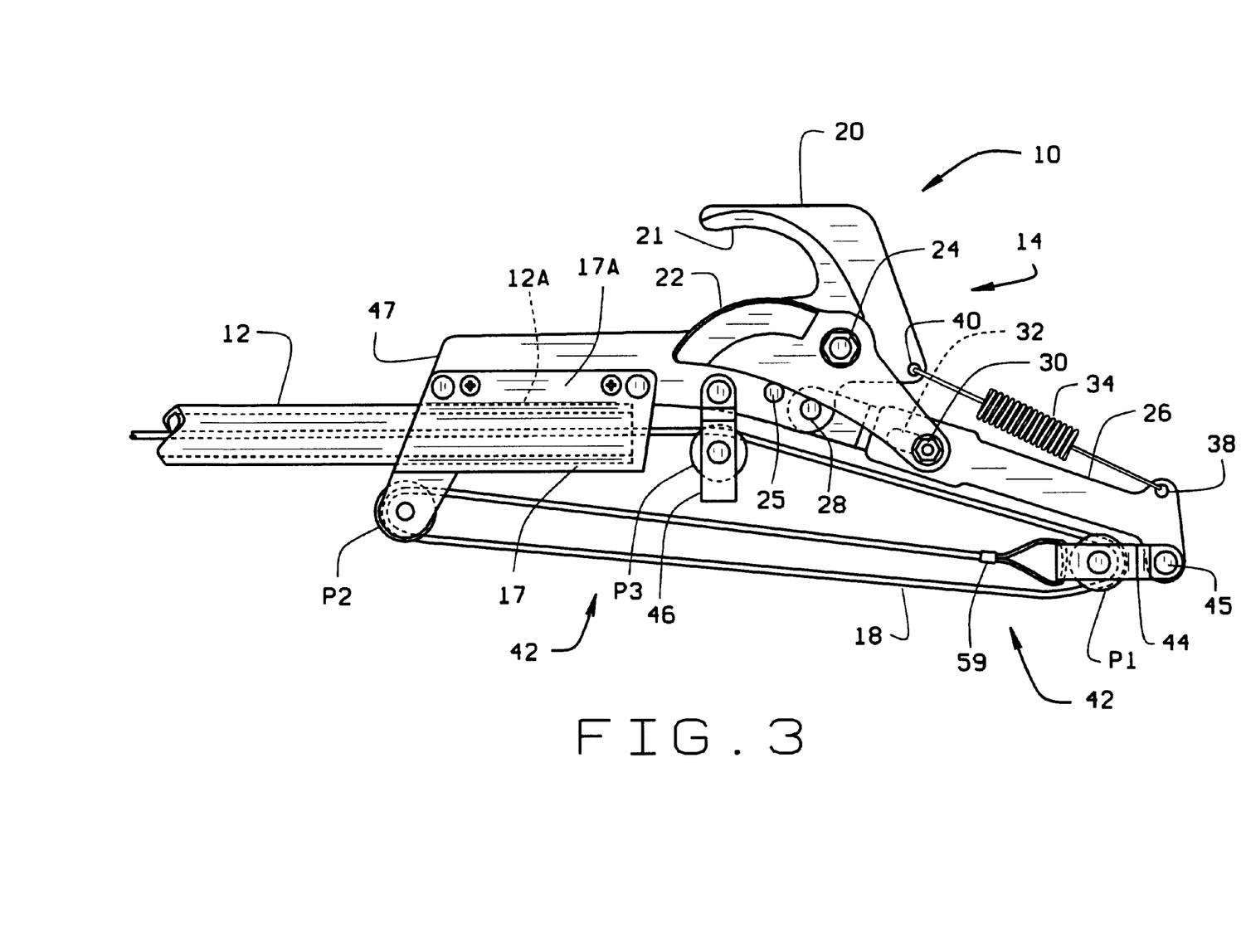
FIG. 3 is a fragmentary front elevational view of the cutting head shown in FIG. 1 when the cutting head is not actuated.

A coil spring 34 is provided to bias the lever arm 26 as shown in FIG. 3. One end of the spring 34 is attached to an upper end 36 of the lever arm 26 through an opening 38 formed therein, and the other end is attached to the hook body 20 through an opening 40. When pulling or tensile force is applied to the cable 18 by the actuating assembly 16, the lever arm 26 pivots downwardly about the pin 28. When the lever arm 26 moves downward, the blade 22 pivots upwardly toward the hook 20 to a wholly closed position and the spring 34 is extended. When pulling force decreases or is no longer applied to the cable 18, the spring 34 recoils, causing the lever arm 26 to pivot upwardly about the pin 28. At the same time, the blade 22 pivots downwardly away from the hook 20 to a wholly open position. The arrangement shown provides an arcuate throw of about 3.4 cm between the wholly open and wholly closed positions of the blade 22 and a corresponding arcuate throw of about 17 cm for the end of the lever arm 26.

A stop 25 is provided on the hook body 20 to limit the degree of pivotal movement of the blade 22 about the bolt 24 between the wholly open and wholly closed positions. As shown in FIG. 3, the blade 22 rests against the stop 25 in its wholly open position. When tensile force is applied to the cable 18, the blade moves toward the hook cutting surface 21 until the blade 22 hits the stop 25 in the wholly closed position as shown in FIG. 4.

The cutting head 14 also conventionally permits attachment of a saw blade (not shown) that can be attached to the hook body 20 in a conventional manner by a nut and bolt.

As shown in FIGS. 1–4, the cable 18 is passed around a tackle or pulley assembly 42 upon exiting the pole 12. The pulley assembly 42 provides a mechanical advantage to pulling force applied to the cable 18 by the actuating assembly 16. The pulley assembly 42 conventionally includes a first floating pulley P1 rotatably attached to the lever arm 26 by a first bracket 44 and a rivet or pin 45, and a fixed pulley P2 attached near a base 47 of the pole clamp 17 as shown in FIG. 3. The first floating pulley P1 and fixed pulley P2 are strung and configured as a conventional inverted gun tackle purchase that provides a 3 to 1 mechanical advantage, with the cable attached to the first bracket 44, brought around the second pulley P2, and then around the first pulley P1.

The preferred cutting head 14 differs from the conventional M4B2 head by the addition of a floating pulley P3 and by threading the cable 18 through the pulleys P1 and P2 in a direction opposite the usual direction. The additional floating pulley P3 acts as a guide for the cable 18 as it enters the tubular pole 12. The guide pulley P3 is attached to the hook body 20 by a third bracket 46 in close proximity to the upper end 12A of the pole 12 and pole clamp 17. The third bracket 46 is pivotally mounted to the cutting head 14 on a pin 48. This configuration allows for pivotal movement of the pulley P3 when pulling force is applied to the cable 18 and the lever arm 26 moves downwardly (see FIG. 4). The floating pulley P3 is held by rivet 48 in such a position that when the cable 18 is pulled its bracket 46 rotates downwardly into contact with the upper end of the pole clamp 17. In this position, the pulley P3 is free to rotate and positions the cable properly in the pole 12. It will be seen that the cable 18 is tensioned around all three pulleys P1, P2, and P3 in all positions of the blade 22 and is thus restrained from jumping the pulleys. The positioning and action of the floating pulley P3 on the cutting head 14 is important to proper operation of the pruner 10.

The pole 12 is preferably a hollow fiberglass pultrusion about 167 cm (66") long and about 2.5 cm (1") in diameter.

Figure 9:
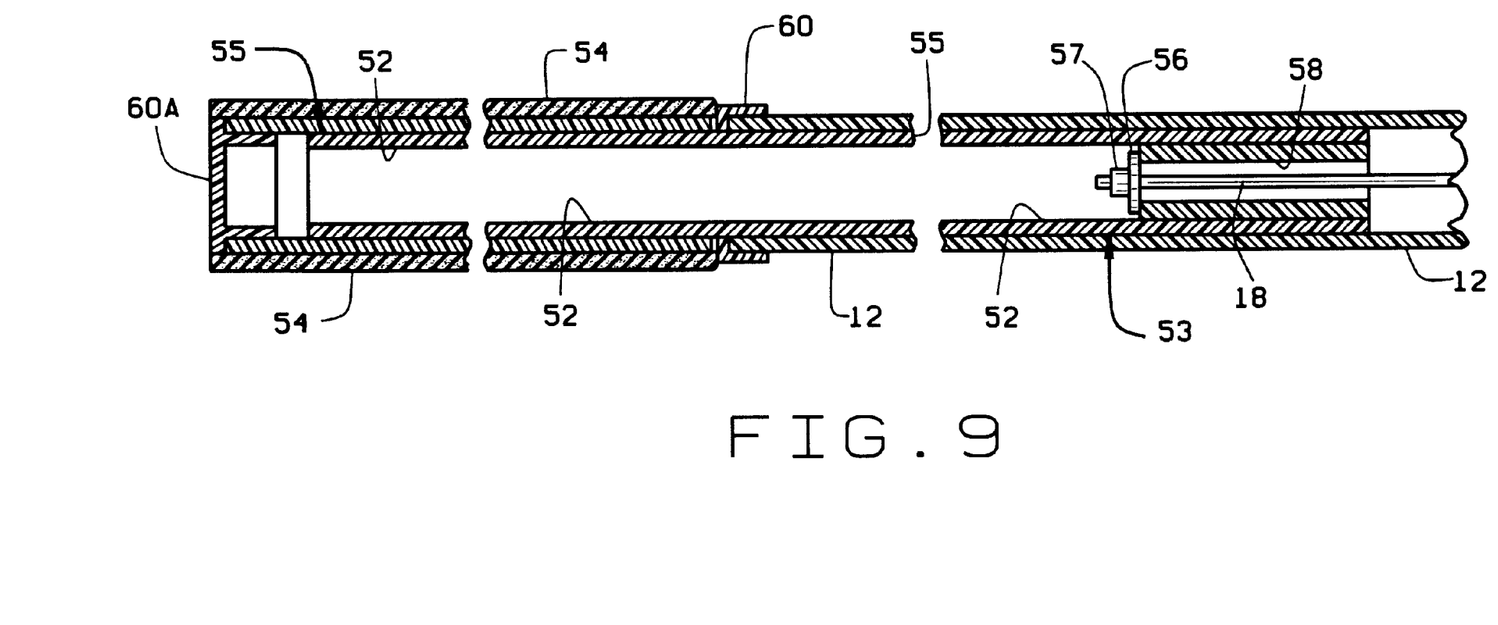
FIG. 9 is a cross sectional view of an actuating handle portion of the pruning device.

The actuating assembly 16 of the preferred embodiment shown in FIGS. 1, 2, and 9 includes a pump action handle 52. The handle 52 includes a first fiberglass pultruded tube 53 that is sized to be telescoped slidably inside the lower end 12B of the pole 12. A second pultrusion 55 has the same exterior diameter as the pole 12 and extends axially downwardly from the pole 12. The second portion 55 is adhered to the lower end of the first portion 53. The handle 52 preferably is approximately thirty-six inches in length, with the second portion 55 being approximately ten inches long.

A cap 60 is adhered to the lower end 12B of the pole 12. The cap 60 has a central opening through which the first portion 53 of handle 52 extends.

The handle 52 preferably has a non-slip material 54 such as a light-weight foam rubber tube secured to the outwardly extending second portion 55 of the handle 52. In the preferred embodiment, the material 54 has substantially the same length as the second portion 55 (i.e., slightly more than ten inches in the preferred embodiment). This material 54 improves the grip of the user on the handle 52 so that the user's hand does not slip off of the handle 52 when pulling downwardly. A second foam rubber sleeve 54, about eight inches long, is secured to the pole about 24.0 cm above the bottom of the pole. The use of such sleeves on pole pruners is well known in the art.

The cable 18 is secured inside the handle as shown in FIG. 9. Before threading the cable through the pulley assembly 42, the cable 18 is positioned longitudinally through the pole 12 and handle 52. The cable 18 also passes through a tubular cable retaining bushing 58 that is disposed inside the handle 52. The bushing 58 is approximately 4 to 5 inches in length, and is glued inside the first tube portion 53 of the handle 52 at its upper end as shown in FIG. 9. The cable then is threaded through a washer 56, and a fastener 57 such as a Nico™ crimp sleeve fastener is secured to the end of the cable 18 to prevent the cable 18 from passing through the washer 56. The bushing 58 has an interior diameter smaller than the outer diameter of the washer 56 so that the washer 56 cannot pass through the bushing 58. The cable 18 is then passed through the pulley assembly 42 to establish proper tension in the cable 18, and its end is looped around the bracket 44 of the first pulley P1 and crimped to itself with a Nico™ sleeve fastener 59. The washer 56 also prevents the handle 52 from becoming disengaged from the pole 12 when the handle 52 is pulled axially outwardly by a user. A cap 60A is secured to the outer end of the handle 52 after the fastener 57 is secured to the cable 18.

The handle 52 can be slidably moved along a longitudinal axis of the pole 12 between a first normally retracted position (FIG. 1) and a second extended position (FIG. 2) by a user. By pulling the handle 52 downwardly, tensile or pulling force is exerted on the cable 18 which forces the lever arm 26 to move downward and the blade 22 to pivot toward the hook 20. When the blade 22 is in the wholly closed position, the handle 52 is fully extended such that approximately 13.5 inches of the first section 53 of the handle 52 is exposed between the second section 55 and the lower end of the pole 12. When the user releases the handle 52, the spring 34 forces the blade 22 to return to the wholly open position and the handle 52 to return to its retracted position. The cap 60 acts as a bumper in cooperation with the upper end of the second portion 55 to protect the handle 52 and the pole 12 when the handle is released from its extended position and returns to the retracted position. In the preferred embodiment, the foam sleeve 54 on the handle 52 extends slightly above the portion 55 and engages the cap 60 to provide further cushioning.

To enable a customer to operate the pruning device 10 before purchasing the product, and to visually observe the movement of the cutting head components upon its actuation, package 62 is provided as shown in FIGS. 5–8. The package 62 includes a front panel 64, side panel 66, and back panel 68 vacuum formed from a single piece of stiff, transparent plastic. The front panel 64 is hingably secured to one edge 66a of side panel 66, and the back panel 68 is hingably secured to an opposite edge 66b of the side panel 66. The front panel 64 generally includes a substantially rectangular surface 61 having a top wall 63a, a bottom wall 63b and two side walls 63c and 63d disposed around the periphery of the surface 61. The walls 63a–d extend upwardly from the surface 63 and are outturned at their upper edge to form a continuous outturned flange 69a around the package 62. It will be seen that the flange 69a is integral with the hinge edge 66a and forms the outer leaf of the hinge. Similarly, the back panel 68 includes a substantially rectangular surface 65 having a top wall 67a, a bottom wall 67b and two side walls 67c and 67d disposed around the periphery of the surface 65. The walls 67a–d extend upwardly from the surface 63 and are outturned at their upper edge to form a continuous outturned flange 69b around the package 62. The flange 69b forms the outer part of the hinge edge 66b. As discussed in greater detail below, the surfaces 61, 65 of the front and back panels 64, 68 are vacuum formed to define a cavity 98 therebetween that is sized to receive the cutting head 14 therein.

The front panel 64 is adapted to be detachably engaged with the back panel 68. In the preferred embodiment, a plurality of bosses 70 are formed in the back panel 68 which are matingly received in one of a plurality of recesses 72 formed in the front panel 64. The use of bosses 70 and recesses 72 permits the front and back panels to be snapped together and separated repeatedly, thereby allowing the package 62 to be used by the consumer as a protective storage box for the pruning device.

An inwardly extending rim 90 is formed around the periphery of the surface 61 of front panel 64. More specifically, the rim 90 is integrally formed with and extends inwardly from the top wall 63a, the bottom wall 63b, the side wall 63c and a portion of the side wall 63d. The back panel 68 has a peripheral rabbet forming a recessed seat 92 formed in the top wall 67a, bottom wall 67b, side wall 67c and a portion of side wall 67d. The seat 92 is sized to snugly receive the rim 90 of the front panel 64 when the front panel 64 is moved into engagement with the back panel 68.

As mentioned above, the front and back panels 64, 68 have vacuum formed surfaces 61, 65 respectively, that define a cavity 98 therebetween when the front panel 64 is engaged with the back panel 68. The cavity 98 is sized to receive the cutting head 14, and allow for operation of the cutting head 14 while it is disposed inside the package 62. More specifically, the cavity 98 allows for movement of the cutting blade 22, guide pulley P3, and spring 34 within the package 62, while permitting first pulley P1, lever arm 26, and a part of cable 18 to move outside the package 62 when the actuating assembly 16 is operated. Because the package 62 is constructed from a clear plastic material, the customer can view movement of the cutting head 14 components when the pruner 10 is operated. Because of the substantial distance between the actuating assembly 16 and the package 62, it is extremely difficult to tamper with the exposed portions of the cutting head when the actuating assembly is operated.

The surfaces 61 and 65 generally include a plurality of recesses, a plurality of levels disposed in parallel planes, and a plurality of walls extending perpendicularly between the levels that define the cavity. Each recess or level and associated walls define a section of the cavity that is adapted to receive a portion of the cutting head 14.

The surface 61 of the front panel 64 includes an innermost first level 99 on which can be placed informative literature or advertising material. A second level 100 is disposed outwardly from the first level 99, and sized to receive a portion of the hook 20. The second level 100 has a recess 101 formed therein that is sized to retain a bolt (not shown) that can be used to attach a saw blade to the cutting head 14. A third level 102 is disposed outwardly from the second level 100. The third level 102 is sized to receive the blade 22, lever arm 26, spring 34, floating guide and first pulleys P3 and P1, and cable 18. An outwardly extending recess 103 is formed in the third level 102 which is sized to receive bolt 24. The third level 102 also has an outwardly extending recess 104 sized to receive stop 25, and another outwardly extending recess 105 sized to receive bolt 30. Recess 105 allows for movement of bolt 30 within the slot 32 upon operation of the pruner 10. Likewise, the third level 102 is sized to allow for movement of the lever arm 26, spring 34, pulleys P3 and P1, blade 22 and cable 18 when the front panel 64 is engaged with the back panel 68. A recess 106 is disposed outwardly from the first level 99, and sized to snugly receive a portion of the pole clamp 17. A fourth level 107 also is disposed outwardly from the first level 99. The fourth level 107 and associated walls extending inwardly from its periphery are sized to retain the fixed pulley P2. A fifth level 108 is disposed outwardly from the first level 99, and allows for movement of the cable upon operation of the pruner 10. A sixth level 109 is disposed below the fifth level 108 to stiffen the edge of the panel 61. The highest level of the panel 61, recess 104, is substantially coplanar with the peripheral flange 69a.

The surface 65 of the back panel 68 also has a plurality of levels on parallel planes, walls extending between the levels and recesses that define sections of the cavity 98 either individually or in cooperation with levels or recesses of the front panel 64. The surface 65 has an innermost first level 110 having dimensions that are substantially a mirrored image of the first level 99 of the front panel 64. Labels, stickers, cardboard or the like can be attached to the first level 110, or positioned between the first levels 99, 110 of the front and back panels 64, 68, respectively, to display advertisements, designs, instructional information, etc. A second level 111 is disposed parallel to and outwardly from the first level. The second level 111 is sized to receive the hook 20, blade 22, and cable 18. The second level 111 has a first outwardly extending recess 112 formed therein that is sized to receive the bolt for the saw blade (not shown) that can be attached to the hook 20, if desired. A second outwardly extending recess 113 is formed in the second level 111 to receive the bolt 24 that pivotally attaches the blade 22 to the hook 20. A third level 114 is disposed outwardly from the second level 111 that is sized to allow for pivotal movement of the guide pulley P3 upon operation of the pruning device 10. A fourth level 115 is disposed outwardly from the second level 111, and sized to allow for movement of the lever arm 26 upon operation of the cutting head 14. An outwardly extending recess 116 is formed in the fourth level 115 that is sized to retain the pin 28 that pivotally attaches the lever arm 26 to the hook 20. A fifth level 120 is disposed outwardly from the first level 110, and sized to retain the fixed pulley P2. A sixth level 117 is positioned outwardly from the first level 110. The sixth level 117 has dimensions similar to that of a portion of the third level 102 on the front panel 64 and is sized to accommodate lever 26, spring 34, and first pulley P1. Similarly, the back panel 68 includes a stiffening seventh level 118 at a location corresponding to that of the sixth level 109 on the front panel 64 when the package 62 is assembled. The back panel 64 also has a recess 119 disposed below the first level 110 that is formed to snugly retain a portion of the pole clamp 17.

When the panels 64 and 68 are engaged, recess 106 of the front panel 64 and recess 119 of the back panel 68 form an opening 128 in the bottom walls 63b, 67b of the panels 64 and 68, respectively, through which the pole 12 extends when the cutting head 14 is disposed inside the cavity 98.

Figures 6, 7, 8:
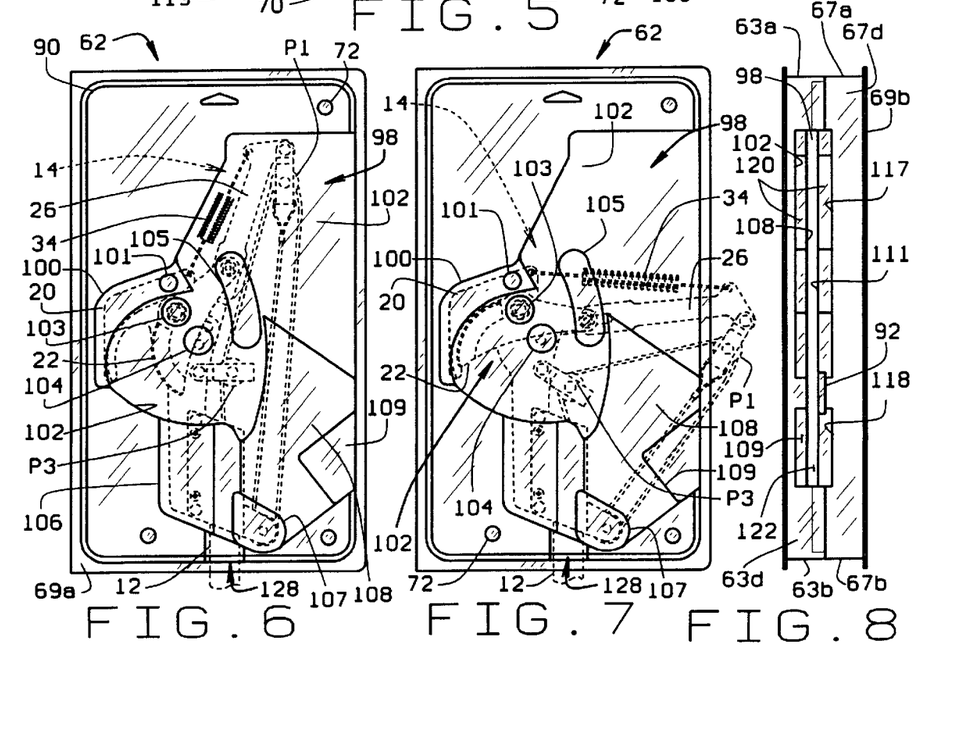
FIG. 6 is a front elevational view of the front panel of the package showing the cutting head in phantom when the actuating assembly is not triggered.
FIG. 7 is a front elevational view of the front panel of the package showing the cutting head in phantom when the actuating assembly is triggered.
FIG. 8 is a side elevational view of the package showing openings through which the lever arm, pulley and cable pass when the actuating assembly is triggered.

When the front and back panels 64, 68 are engaged, the section of the cavity 98 between the sixth level 117 on the back panel 68 and the corresponding portion of the third level 102 on the front panel 64 form an opening 120 in the side walls 67d and 63d (FIG. 8). The opening 120 allows for passage of the lever arm 26, pulley P1 and cable 18 therethrough upon operation of the cutting head 14 (FIG. 7).

An opening 122 is formed in the side walls 63d and 67d between the fifth level 108 of the front panel 64 and the second level 111 of the back panel 68 (FIG. 8). The opening 122 allows for passage of the cable 18 therethrough upon operation of the cutting head 14.

An opening 80 is provided in the front and back panels 64, 68 that allows the package 62 to be mounted on a hook or pole (not shown) to display the product for sale.

In view of the above, it will be seen that the several objects and advantages of the present invention have been achieved and other advantageous results have been obtained.

The foregoing description is set forth for illustrative purposes only and is not meant to be limiting. As various changes could be made in the above constructions without departing from the scope of the invention, it is intended that all matter contained in the above description or shown in the accompanying drawings shall be interpreted as illustrative and not in a limiting sense. For example, another type of actuating assembly 16 can be used that applies a tensile or pulling force to the cable 18. One such actuating assembly includes a conventional ratchet assembly that is mounted at the lower end 12B of the pole 12. The ratchet assembly generally includes a pawl that engages sloping teeth of a toothed cable spool on which one end of the cable is wound. A conventional trigger handle is provided with the ratchet assembly such that as the trigger is squeezed against the handle, the pawl permits incremental rotation of the spool which, in turn, applies an increasing tensile force on the cable to move the blade toward the hook. When the trigger is released, the pawl is disengaged from the teeth and the spool unwinds to release the tensile force applied to the cable. The cable may be formed of materials other than steel, and can be a chain or rope, the term "cable" being used herein in a broad sense encompassing any such flexible line for exerting a tensile force on the blade 22. Although not presently preferred, the pole 12 also can have a variable length. In this configuration, the pole 12 can include a first portion telescopically mounted inside a second portion, and a convenient means provided for taking up or extending the cable 18, such as an inertial reel. In this configuration, the reel can be spring loaded with a brake so that the brake can be released to increase or decrease the length of the cable. Numerous other variations, within the scope of the appended claims will be apparent to those skilled in the art in light of the foregoing description and accompanying drawings.

We claim:

1. A pruning device comprising:
   a hollow tubular pole having an upper end and a lower end;
   a cable extending axially inside said pole;
   an actuating assembly mounted at the lower end of said pole;
   a cutting assembly mounted on the upper end of said pole, said cable connecting said actuating assembly to said cutting assembly;
   said cutting assembly including a pole clamp; a stationary hook body attached to the pole clamp, the hook body including an arcuate surface adapted to receive a limb; a cutting blade pivotally mounted to the hook body, said cutting blade pivotally moving toward said hook upon operation of said actuating assembly; a lever arm operatively connected to said blade, and a floating guide pulley pivotably connected to said hook body proximate the second end of said pole;
   the cable being operatively connected to the lever arm and extending around said guide pulley between the guide pulley and the hook body;
   said actuating assembly including a first portion telescopically mounted inside the first end of said pole and attached to said cable, and a second portion extending axially outwardly from the first end of said pole, said actuating assembly being slidably movable between a normally retracted position and an extended position, said handle applying pulling force on said cable when said handle is moved axially outwardly from the retracted position to the extended position;
   said actuating assembly further including a cable retaining bushing secured inside said handle, said bushing having said cable inserted therethrough, a washer through which one end of said cable is threaded upon exiting said bushing, said washer having an outer diameter greater than an inner diameter of said bushing, and a clamp secured around the end of said cable to prevent said cable from passing through said washer.

2. The pruning device of claim 1 wherein the guide pulley includes a bracket movable between a position spaced from the pole clamp and a position contacting the pole clamp, the bracket moving to said second position in response to operation of the actuating assembly.

3. The pruning device of claim 1 wherein the cutting assembly comprises a floating pulley pivotally connected to said lever arm by a bracket and a fixed pulley connected to said cutting head below said first pulley, the cable extending through the guide pulley, then the lever arm pulley, then the fixed pulley, then secured to the bracket of the lever arm pulley.

4. A pruning device for cutting limbs, comprising:
   a hollow tubular pole having an upper end and a lower end;
   a cable extending axially through said pole;
   a cutting assembly mounted on the upper end of said pole for engaging and cutting a limb, said cutting assembly being operably connected to a first end of said cable,
   an actuating assembly mounted on the lower end of said pole, said actuating assembly being operably connected to a second end of said cable to operate said cutting assembly by pulling said cable, said actuating assembly comprising a slide tube slidably mounted in said tubular pole, a handle at a lower end of said slide tube, a second tube adhered inside said slide tube, the second tube being shorter than the slide tube, and a stop member attached to the second end of said cable, the stop member engaging a lower end of the second tube.

5. The pruning device of claim 4 wherein said stop member comprises a washer, said washer having an outer diameter greater than an inner diameter of said second tube.

6. The pruning device of claim 5 further comprising a clamp secured around the end of said cable to prevent said cable from passing through said washer.

7. The pruning device of claim 4 wherein said cutting head further includes a hook adapted to receive the limb and a cutting blade pivotally mounted to said hook, said blade pivotally moving toward said hook upon operation of said actuating assembly.

8. The pruning device of claim 7 wherein said cutting head further includes a lever arm pivotally connected to said hook, and connected to said blade for increasing force with which said blade moves toward said hook upon operation of said cutting head.

* * * * *